United States Patent [19]

Kakade

[11] 4,132,808

[45] Jan. 2, 1979

[54] METHOD OF FEEDING YOUNG ANIMALS

[75] Inventor: Madhu L. Kakade, St. Paul, Minn.

[73] Assignee: Land O'Lakes, Inc., Minneapolis, Minn.

[21] Appl. No.: 752,456

[22] Filed: Dec. 20, 1976

[51] Int. Cl.$^2$ ............................................. A23K 1/18
[52] U.S. Cl. ............................................ 426/2; 426/72; 426/74; 426/430; 426/431; 426/629; 426/634; 426/807
[58] Field of Search ............... 426/629, 630, 2, 72, 426/634, 74, 430, 431, 635, 623, 598, 807

[56] References Cited

U.S. PATENT DOCUMENTS

| | | | |
|---|---|---|---|
| 3,170,802 | 2/1965 | Fukushima | 426/46 |
| 3,268,503 | 8/1966 | Mustakas et al. | 426/634 |
| 3,677,767 | 7/1972 | McNeff | 426/2 |
| 3,798,339 | 3/1974 | Peng | 426/580 |
| 3,846,559 | 11/1974 | Stevens | 426/2 |
| 3,862,337 | 1/1975 | Osborne | 426/2 |
| 3,875,304 | 4/1975 | Hunt et al. | 426/807 X |
| 3,908,020 | 9/1975 | Schroeder | 426/2 |
| 3,956,482 | 5/1976 | Hahn et al. | 426/2 X |

OTHER PUBLICATIONS

Morrison, "Feeds and Feeding", Morrison Publishing Co., 1957, pp. 672–673.

*Primary Examiner*—R. B. Penland
*Attorney, Agent, or Firm*—Frederick E. Lange

[57] ABSTRACT

Young animals, ruminant or otherwise, which employ monogastric digestion, e.g. calves, are fed a milk substitute prepared with soybean protein which has been heated in presence of a lower alcohol and water, with unexpectedly rapid increase in animal weight.

4 Claims, No Drawings

METHOD OF FEEDING YOUNG ANIMALS

This invention relates to the feeding of young animals, ruminant or otherwise, which employ monogastric digestion, e.g. calves. The invention relates to improving the rate of gain in weight of the animal by feeding the animal primarily on a soybean substance, which has been subjected to heating in the presence of water and a lower alcohol, in the form of an aqueous suspension.

Simple heat treatment of soybeans, or of soybean products in the form of defatted beans, flakes, meal or flour, has been found to result in an improved animal feed; see Markley, "Soybeans and Soybean Products," Interscience, 1950, for example at pages 394 and 900. United States Fukushima U.S. Pat. No. 3,170,802 describes the treatment of defatted soybean flakes with hot alcohol at up to 150° C. in the production of an intermediate material for the preparation of soy sauce; however, no suggestion is made of using the intermediate product as a direct food source for animals. A treatment for defatted soybean flakes involving a preliminary extraction at room temperature with alcohol and water followed by flash removal of residual liquid at high temperature, described in the United States Mustakas et al U.S. Pat. No. 3,268,503, is there stated to produce a protein concentrate useful as an extender for specialty food products.

It has now been discovered that the heat treatment of a soybean substance in the presence of water and a lower alcohol, such as methanol, ethanol or isopropanol, makes available a feed material which when combined with other materials in a milk-like form, i.e. a fluid mixture of the soybean flour and other materials in water, when fed to calves or other young animals, provides a significant increase in the growth rate of the animal as compared with that obtained with milk substitutes prepared from conventionally heat treated soybean products.

The treatment may be applied to soybeans in particulate form, with full-fat, low-fat, or defatted; but will usually, for reasons of economy and convenience, be applied to defatted soybean in particulate forms. In one example, soybean flour having an initial protein dispersibility index (PDI) of about 90 was employed. (The PDI is a measure of the solubility in water of the protein content of the soybean material, and decreases with increasing denaturation.) The processed flour, having a PDI of not greater than about 30, is then mixed with other material, commonly used in feeding young animals, such as vegetable or animal fat, vitamins, and minerals. This mixture is then further mixed with water or other aqueous vehicle, in the desired concentration to form the milk-like fluid soybean mixture employed in the practice of this invention.

Anhydrous alcohols may be used in the treatment. However the beans or flour usually contain some moisture so that anhydrous conditions will ordinarily not persist. Furthermore, the presence of a considerable proportion of water assists in making possible a higher temperature without requiring greatly increased pressure, the higher temperature reducing the time required for treatment.

In carrying out the process, the soybean substance after having water and alcohol added thereto, is heated under pressure. Continuous removal of vapors may be permitted through a partially opened outlet in the heating chamber. The temperature is maintained for a definite period of time until the desired protein dispersion index has been obtained. The alcohol and most of the water are then removed by a drying process. Thereafter, as described above, the processed flour is mixed with other ingredients such as vegetable or animal fat, vitamins, minerals and other common additives to young animal food and this mixture is then further mixed with water or other aqueous vehicle in the desired concentration to form a milk-like fluid soybean mixture which is periodically fed to the young animals at desired intervals.

Analytical methods for the determination of total protein, protein solubility and various other factors are known, but have not proven to be effective in defining the products here under consideration. However, it has been found possible to indicate the relative effectiveness of various feed materials in terms of the results of comparative practical feeding tests, as shown in the following illustrative but non-limiting Example, in which all proportions are given in parts by weight unless otherwise specified.

EXAMPLE

Sixty parts by weight of defatted soybean flour having a PDI of 90 was uniformly wetted with a mixture of 33.7 parts of 95% ethanol and 6.3 parts of water. The mass was spread onto shallow trays to a uniform depth of one cm. and the trays were loaded into a retort fitted for introduction of live steam and supplied with a pressure gage and steam outlet valve. Steam was introduced under moderate pressure sufficient to maintain the gage pressure at 15 psi while permitting continuous removal of vapors through the partially opened outlet valve. A temperature of 250° F. was attained in the mass on the trays within less than 10 minutes and was maintained for 30 minutes. The retort was then opened and the trays removed. The flour, still evolving odors of alcohol, was dispersed in water for spraying into a drying chamber, and was recovered as spray-dried flour for storage pending test feeding.

Feeding tests were conducted at an experimental farm near Fort Dodge, Iowa. Three series of comparative tests were performed, in which the test animals (young calves) were fed as a source of protein (A) casein, (B) soybeans prepared with conventionally heat-treated or toasted, defatted soybean flour, and (C) soybeans prepared in accordance with the present invention. In each case, the protein source was mixed with other common nutrients such as whey, animal or vegetable fat, vitamins, and minerals. This mixture was then mixed with water to form a milk-like substance which was fed to the animals. The test extended for four weeks in each instance, with results as tabulated.

Gain in weight, lbs., during four week test.

| Trial No. | Feedstock | | |
|---|---|---|---|
| | A | B | C |
| 1 | 28.70 | 23.60 | 30.60 |
| 2 | 25.50 | 22.92 | 26.58 |
| 3 | 29.88 | — | 30.66 |

Test 3B was not carried out.

It will be seen that I have provided a new method of improving the growth rate of young animals, ruminents or otherwise, which employ monogastric digestion, e.i. calves, by producing a relatively high protein product from soybeans which is mixed with an aqueous vehicle and fed to the animals.

While I have described certain specific embodiments, it is to be understood that the scope of the invention is limited solely by that of the appended claims.

I claim:

1. The method of improving the growth rate of young animals employing monogastric digestion comprising: heating a soybean substance selected from the group consisting of full-fat, low-fat and defatted soybeans in particulate form, in the presence of water and a lower alcohol for approximately 30 minutes at approximately 250° F. wherein said heating step involves exposing the substance directly to steam under pressure; removing substantially all of the water and alcohol therefrom by vaporization thereby, producing a dried particulate flour having a PDI of not greater than about 30; mixing said flour with other nutritional materials and water to provide a milk-like substance, and feeding the mixture to said animals.

2. The method of claim 1 wherein said heating step is in presence of a mixture of water and ethanol.

3. The method of claim 1 wherein said animals are calves.

4. The method of claim 1 in which the other nutritional materials are substances from the group consisting of whey, animal or vegetable fat, vitamins and minerals.